(12) United States Patent
Yamada et al.

(10) Patent No.: US 6,411,420 B1
(45) Date of Patent: Jun. 25, 2002

(54) ELECTRO-OPTICAL ELEMENT, AND METHOD OF DRIVING AND METHOD OF MANUFACTURING THE SAME

(75) Inventors: Masahiro Yamada; Toru Domuki; Hitoshi Tamada, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/424,443

(22) PCT Filed: Mar. 24, 1999

(86) PCT No.: PCT/JP99/01478

§ 371 (c)(1),
(2), (4) Date: Mar. 14, 2000

(87) PCT Pub. No.: WO99/49354

PCT Pub. Date: Sep. 30, 1999

(30) Foreign Application Priority Data

Mar. 24, 1998 (JP) .......................................... P10-075346

(51) Int. Cl.$^7$ ................................................. G02F 1/03
(52) U.S. Cl. ........................ 359/247; 359/251; 359/252; 359/279; 359/296; 359/578; 359/586
(58) Field of Search ................................. 359/246, 247, 359/251, 252, 279, 296, 577–590

(56) References Cited

U.S. PATENT DOCUMENTS

| 5,495,352 | A | * | 2/1996 | Shinjo et al. ............... 349/143 |
| 5,552,914 | A | * | 9/1996 | Shinjo et al. ............... 349/139 |
| 5,640,267 | A | * | 6/1997 | May et al. ................... 359/322 |
| 5,652,674 | A | * | 7/1997 | Mizuuchi et al. ........... 359/326 |
| 5,786,926 | A |   | 7/1998 | Yamada ....................... 359/250 |
| 6,064,587 | A | * | 5/2000 | Jo ................................ 365/145 |

FOREIGN PATENT DOCUMENTS

| EP | 0775929 A2 | 5/1997 |
| JP | 3-189634 | 8/1991 |
| JP | 9-146128 | 6/1997 |
| JP | 10-39346 A | * 2/1998 |

OTHER PUBLICATIONS

Yamamoto, K. et al, "Quasi–Phase–Matched Second Harmonic Generation in a LiTaO3 Waveguide," IEEE Journal of Quantum Electronics, vol. 28, No. 9, Sep. 1992, pp. 1909–1914.*

* cited by examiner

Primary Examiner—Evelyn A. Lester
(74) Attorney, Agent, or Firm—Oblon, Spivak, McClelland, Maier & Neustadt, P.C.

(57) ABSTRACT

Polarization inversion domains 2 are irregularly formed in a ferroelectric substrate 3 constituting an electro-optical element 1 at least in the propagation direction of a light beam A. An A.C. current signal is applied between electrodes 4 and 5. It is thereby arranged to disturb the phase of each of the light rays constituting a light beam whose coherent characteristic is high, such as a laser light or the like, and thereby to easily obtain the light beam whose coherent characteristic has been decreased.

25 Claims, 10 Drawing Sheets

⇩,⇧ : DIRECTION OF SPONTANEOUS POLARIZATION

⇩,⇧ : DIRECTION OF SPONTANEOUS POLARIZATION

↕,↑ : DIRECTION OF SPONTANEOUS POLARIZATION

ELECTRO-OPTICAL ELEMENT, AND METHOD OF DRIVING AND METHOD OF MANUFACTURING THE SAME

TECHNICAL FIELD

The present invention relates to an electro-optical element that can make lower the coherent characteristic of a light beam, and a method of driving and a method of manufacturing the same.

BACKGROUND ART

A laser light has an information accommodation capability because its frequency is generally higher than that of the electric waves. Also, since the wavelength is identical and the phase is arranged properly, the laser light has excellent monochromaticity and directivity. And, the laser light has coherent characteristic (interference-making ability characteristic) that an ordinary light beam does not have. Further, because the laser light can be converged extremely thin, the laser light has the feature of, for example, enabling its energy to be concentrated onto a minute area and thereby enabling a high temperature to be realized locally and instantaneously or the like. For this reason, the laser light has hitherto been applied to many fields such as communication or information relations, measurement relations, applications to the fabrication techniques, utilization in the medical field and so on.

However, since in this way the laser light has not only excellent directivity but also high strength and coherent characteristic, in a case where using a laser light as an illumination light, for example, where using the laser light on a laser display, the dot-like glittering, so-called "speckle noise"; that occurs due to its coherence being high become problematic.

As an optical device for decreasing such speckle noises there is known, for example, a bundle fiber, a rotary diffusion plate, or the like.

The bundle fiber has a structure wherein a number of multi-mode fibers are bundled. The bundle fiber shapes the beam configuration of a coherent light beam so as for it to conform to the configuration of the input end of the bundle fiber. By propagating the light beam through the interior of this bundle fiber, the coherent characteristic thereof is decreased.

Each of the respective optical fibers constituting the bundle fiber is a multi-mode optical fiber. As a result of this, the light beam propagating through the interior of the optical fiber propagates by being separated into a plurality of modes. And, since the respective modes are different in propagation speed from each other, the light beams that have been emitted from the optical fiber become the ones that have a variety of phases, respectively. And, since this optical fiber is bundled large in number, the light beams that have been output from the resulting bundle fiber become the ones having an again larger number of phases. As a result of this, the coherent characteristic is eased with the result that the speckle noises are decreased.

However, the phase relation among the light beams emitted from their corresponding optical fibers is always stable when viewed from the aspect of time. Therefore, it is difficult to completely erase the speckle noises away.

On the other hand, the rotary diffusion plate is constructed so that a coherent light beam may be transmitted through a rotating sheet of frosted glass. First, the rotary diffusion plate is arranged to disturb the relation in phase between the constituting components of a light beam, i.e., between the rays constituting a light beam by the use of the frosted glass in view of space, and then to change the relation in phase between the light rays constituting a light beam by rotating this sheet of frosted glass with a motor, etc. from the aspect of time. Namely, the rotary diffusion plate can be said to be the one that has been improved from the above-described speckle noise decreasing method based on the use of the bundle fiber.

However, in this method, it becomes necessary to provide a movable portion such as a motor or the like for rotating the rotary diffusion plate. Therefore, there is the problem that the device becomes large in size and that the power consumption also becomes large.

The present invention has been made in view of the above-described actual circumstances and has an object to provide an electro-optical element that disturbs the relation in phase between the rays of a light beam having a high coherent characteristic, such as laser light, and that makes it possible to easily obtain a light beam whose coherent characteristic has been decreased, and a method of driving and a method of manufacturing the same.

DISCLOSURE OF THE INVENTION

The electro-optical element according to the present invention is constituted by a single piece of ferroelectric substrate having electro-optical effects, or a laminate of a plurality of similar ferroelectric substrates.

This electro-optical element that is composed of a single, or a plurality of, ferroelectric substrates each have an incident surface and an outgoing surface of a light beam. In the propagation passage for a light beam between the incident surface and the outgoing surface is provided a phase displacement means that is constituted by a plurality of, or a single, polarization inversion domain.

Also, on the above-described electro-optical element are provided at least a pair of electrodes that are used for applying an electric field to the formation region of the polarization inversion domain in the ferroelectric substrate.

The polarization inversion domain constitutes the phase displacement means for making irregularly different from each other the phases of the light rays constituting a light beam that is incident upon the ferroelectric substrate. To this end, the polarization inversion domain is made to have the configurations and/or dispositions that are irregular at least in the propagation direction of the light beam.

Also, it is preferable that the polarization inversion domain constituting the phase displacement means be formed irregularly also in a direction substantially perpendicular to the propagation direction of the light beam.

Further, it is preferable that the polarization inversion domain constituting the phase displacement means have a construction wherein the depth thereof is made irregular.

The incident surface and the outgoing surface of the light beam can each be made a mirror surface, or at least one of them, preferably the outgoing surface, can be made a roughened surface.

Also, a part, or all, of the above-described electrodes can each be made to be a transparent electrode having a high transmittance with respect to the incident light beam, whereby one, or both, of the incidence and the outgo of the light can be made through this transparent electrode.

In the method of driving according to the present invention, in the electro-optical element having each of the above-described constructions, between at least a pair of electrodes thereof is supplied a required electric signal, preferably an A.C. current signal, more preferably an A.C. current signal having D.C. current components superimposed thereon. By doing so, the refractive index of the polarization inversion domain and that of other portions are differentiated from each other. And by this polarization inversion domain that has been irregularly formed, phase displacement is performed with regard to the light rays constituting the light beam that passes through the polarization inversion domain, thereby differentiating the phases of the respective light rays from one another, accordingly, decreasing the coherence, i.e., interference characteristic of the light beam.

In the manufacturing method of the electro-optical element according to the present invention, there is executed a first step for forming, in a part of the ferroelectric substrate constituting the electro-optical element that has each of the above-described respective constructions, a first polarization inversion domain, from one main surface of the substrate, partly, or wholly, in the thickness direction of the ferroelectric substrate, with an irregular pattern.

Next, there is executed a second step for reducing the depth of the first polarization inversion depth to a prescribed depth. Next, there is executed a third step for forming, in another part of the ferroelectric substrate constituting the electro-optical element, a second polarization inversion domain, from one main surface of the substrate, partly, or wholly, in the thickness direction of the ferroelectric substrate.

Further, according to the necessity, similarly, there is executed a fourth step for maintaining the resulting substrate to be at a prescribed temperature not higher than the Curie temperature for a required period of time to thereby reducing the depth of each polarization inversion domain to a required depth.

In the first and the third step, electrodes are provided on both of the mutually opposing main surfaces of the ferroelectric substrate, and a voltage is applied between these electrodes to thereby form the first and the second polarization inversion domain.

Or, in the first and the third step, charged particles having negative or positive charge are radiated onto the surface on the negative side or positive side of the spontaneous polarization, of the ferroelectric substrate to thereby form the first and the second polarization inversion domain.

Also, the second and the fourth step can be executed by maintaining the ferroelectric substrate to be at a prescribed temperature lower than the Curie temperature.

In each of the above-described electro-optical element, the ferroelectric substrate thereof is constituted by a crystal of $LiNb_x Ta_{1-x} O_3$ (where $0 \leq x \leq 1$), and there is executed the step for maintaining this substrate to be at a prescribed temperature not higher than the Curie temperature in an atmospheric air or in an atmosphere of oxygen.

Also, in each of the above-described electro-optical element, the ferroelectric substrate thereof is constituted by a crystal of $LiNbO_3$, and there is executed the step for maintaining this ferroelectric substrate to be at a temperature of from 300° C. to 1150° C. within 30 hours as counted from the instantaneous moment in an atmospheric air or in an atmosphere of oxygen.

BEST MODE FOR CARRYING OUT THE INVENTION

Figure 1:
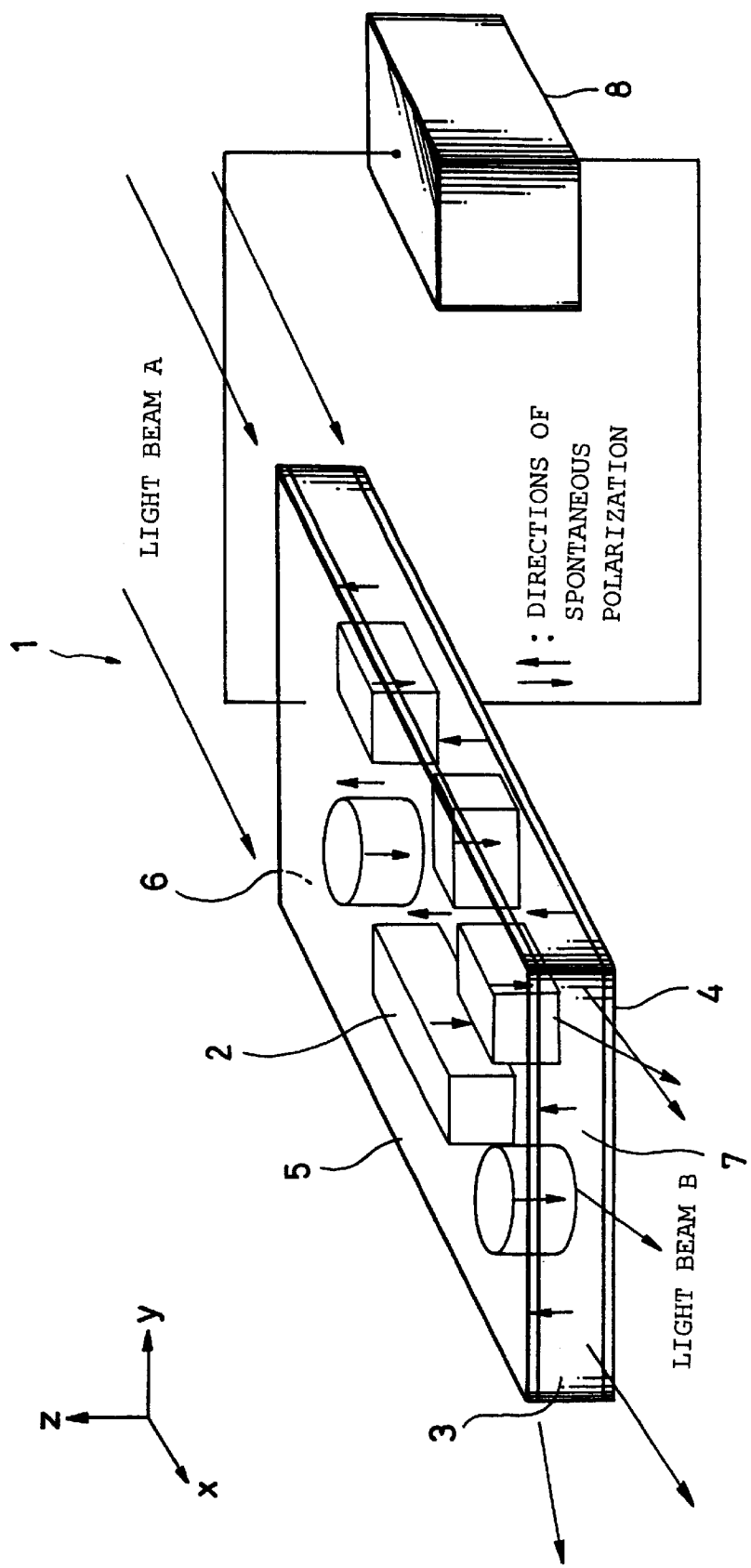
FIG. 1 is a schematic perspective view illustrating an electro-optical element according to the present invention.

An electro-optical element according to the present invention is constituted by a single, or a plurality of, ferroelectric substrates that are each shaped like a rectangular-parallelepiped like substrate and that each have electro-optical effects.

In this ferroelectric substrate, the phase displacement means is formed by polarization inversion domains that have been irregularly formed at least in the propagation direction of a light beam.

Also, at least a pair of electrodes are provided which are used for applying a required electric field to the formation part where this phase displacement means is formed.

The phase displacement means has a construction wherein a plurality of the polarization inversion domains each having an irregular configuration are irregularly disposed in the propagation direction of a light beam, or is constructed by disposing a single piece of the polarization inversion domain having an irregular configuration.

It is preferable that the polarization inversion domains be irregularly formed also in the direction perpendicular to the propagation direction of a light beam.

Namely, the polarization inversion domains are each disposed so that the light rays constituting a light beam that propagates through the ferroelectric substrate may pass through the domain wall at least twice by entering into the polarization inversion domain and going out of the same. Specifically, it is arranged that a plurality of the light rays differ from one another, with respect to the polarization inversion domain, in respect of, for example, the number of the polarization inversion domains which they pass through, the angle of incidence, the angle of outgo, the distance by which they pass through the interior of the polarization inversion domain, etc.

And when making a construction causing a light beam to propagate through the interior of the ferroelectric substrate in a prescribed one direction, it is arranged that the domain wall of the polarization inversion domain be formed perpendicularly, or substantially perpendicularly, to this propagation direction. By doing so, it is possible to effectively avoid the refraction and scatter of the light beam due to the domain in other directions than the propagation direction thereof.

Namely, for example, when the electro-optical element is constituted by a rectangular-parallelepiped-shaped plate-like ferroelectric substrate; the mutually opposing end surfaces between both of the main surfaces thereof are made to be an incident surface and an outgoing surface, respectively; and the propagation direction of the light beam is made to be the main-surface direction of the ferroelectric substrate, i.e., the plate-surface direction thereof, it is arranged that at least one of the domain walls of the polarization inversion domain is made perpendicular, or substantially perpendicular, to the main surface of the ferroelectric substrate, whereby light beam passes through at least two of the domain walls. And by making the domain wall perpendicular, or substantially perpendicular, to the main surface of the ferroelectric substrate in this way, it is possible to cause light beam to propagate stably between the incident surface and the outgoing surface of light beam along the planes parallel with the main surface.

Also, for example, when this ferroelectric substrate is shaped like a plate, as stated above, the propagation direction in the ferroelectric substrate of light beam can indeed be made to be the plate-surface direction thereof. However, the propagation direction can also be made to be the thickness direction of the ferroelectric substrate.

Also, even in a case where making the main propagation direction of light beam a prescribed direction, for example, the plate-surface direction, it is also possible to form a reflection surface on a part, or the whole, for example, of each, or one, of the main surfaces of the plate and, while reflecting and bending light beam, causing this light beam to propagate in the prescribed direction, thereby to make the length of the optical path large.

Further, it is also possible to laminate the ferroelectric substrate having the above-described polarization inversion domains two pieces or more in number to thereby form the propagation optical path of light beam throughout a plurality of the ferroelectric substrates and thereby make the length of the optical path large.

Also, the incident and outgoing surfaces of the electro-optical element, namely, the incident surface and the outgoing surface of light beam of a single piece, or a plurality of pieces of, the ferroelectric substrates that constitute this electro-optical element, can indeed be so constructed as to increase the incidence efficiency and the outgo efficiency thereof by making each of the surfaces a mirror surface. However, by making either the incident surface or the outgoing surface, especially the outgoing surface, a roughened surface that would cause the scatter of light, it is possible to more decrease the coherent characteristic.

The driving method of the present invention is in the above-described electro-optical element of the present invention to apply a required electric field to the phase displacement means that has been constituted by the above-described polarization inversion domain and thereby to cause this phase displacement means to exhibit its function, and thereby to decrease the interference-causing ability characteristic, i.e., the coherent characteristic of light beam.

That is to say, between at least a pair of the electrodes that have been formed on the electro-optical element is supplied a required level of voltage, preferably an A.C. current signal, or more preferably an A.C. current signal having a D.C. current voltage superimposed thereon.

By doing so, in correspondence with an applied signal, in the ferroelectric substrate, the refractive index of light at the polarization inversion domain thereof and that of light at other portions thereof come to differ from each other from the aspect of time. For this reason, the travel velocity of light within the polarization inversion domain and that of light at other portions than this inversion domain differ, and further the resulting travel of light changes also from the aspect of time. Also, additionally, many other factors associated with light each differ and change, such as, the lengths of the optical paths inside and outside the polarization inversion domain differ due to the difference in the incident angle, outgoing angle, etc. of light with respect to the polarization inversion domain, due to the irregularity characteristic of the configuration of the domain, etc. As a result of this, the phases of the light rays constituting the light beam differ from one another, and it is thereby possible to cause the variation in phase and thereby to cause a decrease of the interference-causing ability characteristic, i.e., the coherent characteristic of the light beam.

Namely, the irregularity characteristic of the polarization inversion domain that is formed in the electro-optical element of the present invention means making irregular the phase of each of the light rays constituting a light beam made incident upon the domain, for example, a laser light beam, between these light rays to thereby decrease the coherence thereof.

And, when driving the electro-optical element, as the electric signal applied thereto it is preferable to use an A.C. current signal in order to obtain the effect of causing the above-described change of the phase from the aspect of time. However, in this case, at the point in time of 0 V, the instant at which the refractive index of light beam in the polarization inversion domain coincides with that of light beam in other portions occurs. At this time, the effect of the decrease in the coherent characteristic is lost, whereby there occurs the instant at which speckle noises generate. Therefore, in order to avoid the occurrence of this inconvenience, it is preferable to supply an A.C. current signal having a D.C. current signal superimposed thereon.

Also, the manufacturing method of manufacturing the electro-optical element according to the present invention is directed to manufacturing the electro-optical elements according to the present invention, whose constructions are as described above. This manufacturing method is as follows. Namely, in a first step, a first polarization inversion domain is formed. Then, in a second step, the depth of this first polarization inversion domain is controlled, and, in a third step, a second polarization inversion domain is formed. And, further, for example, in a fourth step, the depth of the polarization inversion domain is controlled, whereby a plurality of polarization inversion domains each having an irregularity characteristic are formed.

Also, in this case, by repeatedly performing the operation in the first step and the operation in the second step, it is possible to form the polarization inversion domains that are more complex and more irregular as a whole.

The formation of the polarization inversion domains in the first and the third step is performed by respectively providing electrodes on both mutually opposing main surfaces of the ferroelectric body and applying a voltage between these opposing electrodes. Or, said formation thereof can be performed by irradiating charged particles having negative or positive electric charge therewith onto the surface on the negative or positive side of the spontaneous polarization of the ferroelectric substrate.

Also, the second and the fourth step can be performed by maintaining the ferroelectric substrate to be at a temperature lower than the Curie temperature thereof. For example, in a case where the ferroelectric substrate is composed of a crystal that is represented by $LiNb_x Ta_{1-x} O_3$ (where $0<x<1$), it is preferable to maintain this ferroelectric substrate to be at a temperature not higher than the Curie temperature in an atmospheric air or in an atmosphere of oxygen. Incidentally, the Curie temperature of this $LiNb_x Ta_{1-x} O_3$ is approximately 600° C. when x=0, and 1200° C. or lower when x=1. And in a case where the ferroelectric substrate is composed of $LiNbO_3$, the second and the fourth step are performed by maintaining the ferroelectric substrate at a temperature of from 300 to 1150° C. for 30 hours as counted from the instantaneous moment in an atmospheric air or in an atmosphere of oxygen.

The manufacturing method of the present invention will now be explained in detail with reference to FIGS. 6 to 8.

First, as a method of fabricating the polarization inversion domains that each have a depth that covers the whole in the thickness direction of the ferroelectric substrate (the entire thickness of the substrate), there are, for example, a method of applying a voltage to the substrate directly, and a method of irradiating charged particles such as electron beams.

First, an explanation will now be given of the method of applying a voltage to, for example, a plate-like ferroelectric substrate 41 directly. In this case, for example, as have the electric field applying direction conceptually illustrated in FIG. 6, an electrode 46 that corresponds to the configuration of a domain wanted to be formed is formed, by adherence, on a z surface (+c surface) of the ferroelectric substrate 41 that consists of a z plate that is made of lithium niobate ($LiNbO_3$). The formation of this electrode 46 is made, for example, by adhering an Al conductive film onto the entire surface of the substrate 41 and thereafter performing pattern etching with respect to the resulting substrate 41 by the use of an ordinary photolithography technique, to a prescribed configuration. Also, on the other surface of the z surface 41, i.e., −z surface (−c surface) as a whole is formed a flat electrode 44. And an electric field of, for example, 20 kV/mm or more is applied at room temperature from the power source 47 so that the electrode 46 on the +z surface may become higher in potential than the electrode 44 on the −z surface. As a result of this, right beneath the electrode 46 are formed a plurality of domains 42 each having an inverted polarization, with substantially the same pattern as that of the electrode 46.

Figure 6:
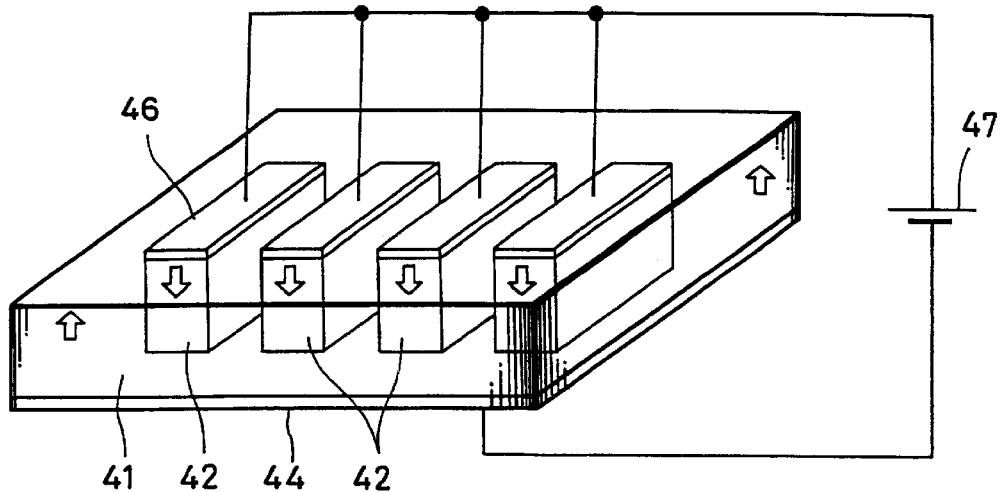
FIG. 6 is a schematic perspective view illustrating a formation method of forming polarization inversion domains according to a manufacturing method of the present invention.
Figure 7:
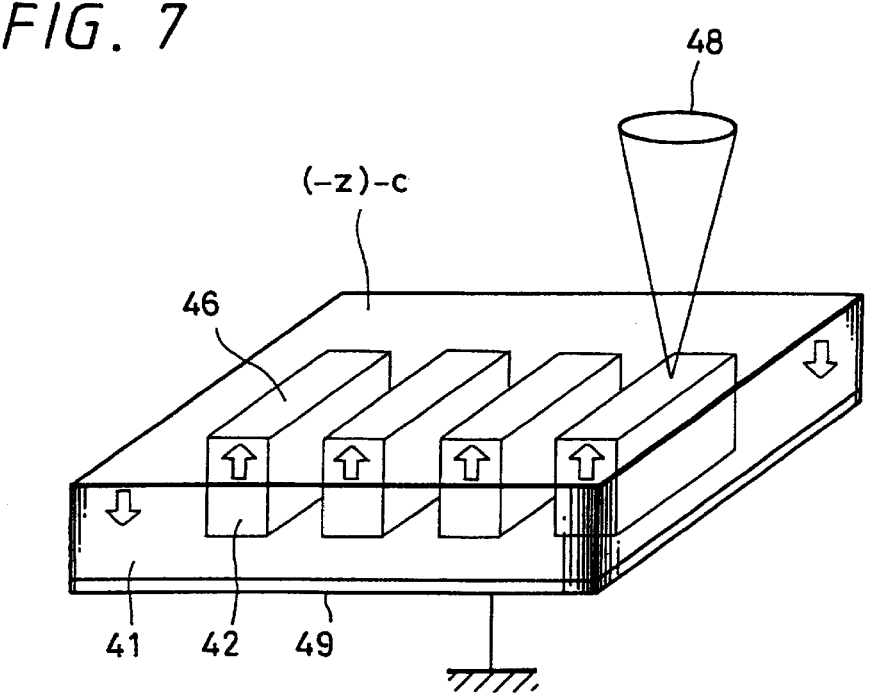
FIG. 7 is a schematic perspective view illustrating the formation method of forming the polarization inversion domains according to the manufacturing method of the present invention.

It is to be noted that similar methods to the domain forming method based on application of an electric field from outside, which was stated in connection with FIG. 6, are also stated in Japanese Patent Application Laid-Open Publication No. Hei 2-187735 and in a literature (the treatise "Similar Phase Matching wave-guide Path Type SHG Element" by Masahiro Yamada et al on The Treatises Collection of the Learned Society on the Electronic Information Communication, C–I, Vol. J77–C–I, No. 5, pp. 206–213 (1994)). These methods can be applied as the manufacturing method of the present invention.

Next, the method of forming the polarization inversion domains by irradiating charged particles such as electron beams will be explained with reference to a conceptual view of FIG. 7. In this case, on the +z surface (+c surface) of the ferroelectric substrate 41 that consists of a z plate that is made of, for example, lithium niobate is formed a flat surface 49 by, for example, adhering an aluminum film onto this +z surface. Then, in a state where this flat surface is earthed, onto the portion on the −z surface (−c surface) wanted to have the domains 42 formed thereon are radiated, while being scanned, at room temperature, electron beams 48 having a value of, for example, 20 kV (acceleration voltage)×t (where the t represents the thickness (mm) of the substrate 41).

As a result of this, in the interior of the substrate 41, it is possible to form a plurality of domains 42, whose polarization is inverted, with a prescribed pattern.

Incidentally, as the method of forming the domains with the irradiation of electron beams, there can be applied the methods of forming the polarization inversion domains, which are described in Japanese Patent Application Laid-Open Publication Nos. Hei 4-270322 and Hei 4-270323, and in a literature (M. Yamada and K. Kishima, "Fabrication of periodically reversed domain structure for SHG in $LiNbO_3$ by direct beam lithography at room temperature" Electron. lett., Vol. 27, No. 10, pp. 828–829 (1991)).

The above-described two kinds of domain forming methods are effective with respect to the ferroelectric substrate that is made of $LiNb_x Ta_{1-x} O_3$ (where $0<x<1$), KTP ($KTiOPO_4$), etc.

With the methods that have been shown above by way of example, it is possible to form the polarization inversion domains each of which covers the whole in the thickness direction of the ferroelectric substrate. And next, an explanation will be given of the method of fabricating the polarization inversion domains so as for these domains to have random depths from one main surface of the ferroelectric substrate in the thickness direction thereof.

Figure 8A:
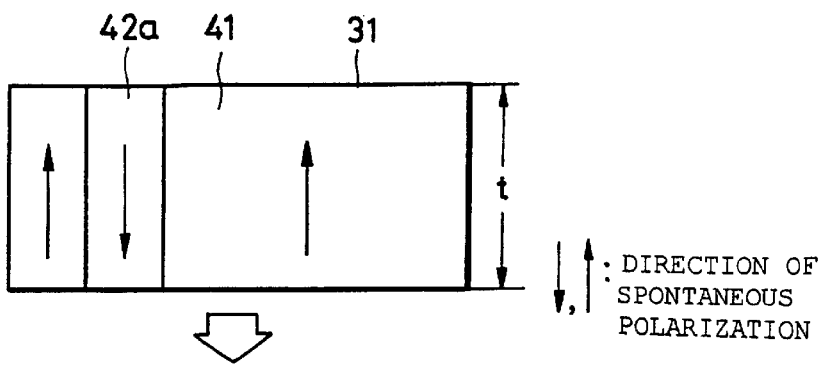
FIGS. 8(A) to 8(D) are schematic views illustrating the formation method of forming the polarization inversion domains according to the manufacturing method of the present invention.

In this case, for example, as illustrated in FIG. 8A, in a part of the ferroelectric substrate 41 that has a thickness t in the depth direction thereof and that consists of, for example, lithium niobate ($LiNbO_3$), for example, with one of the above-described methods, there is formed a polarization inversion domain 42a whose depth covers substantially the entire thickness of the substrate 41 from a main surface 31 thereof (first step).

Figure 8B:
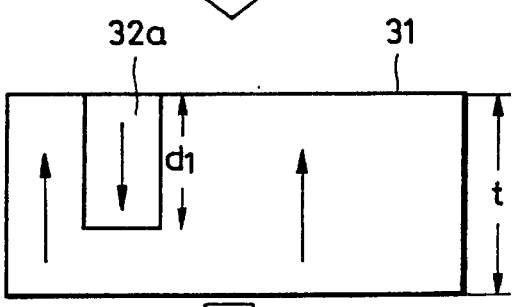

Subsequently, for example, the resulting substrate is annealed at a temperature not higher than the Curie temperature thereof, preferably 300 to 1150° C., in an atmospheric air or in an atmosphere of oxygen for a prescribed period of time. In this annealing, the annealing time period is selected to be from 0 minute (instantaneous moment) to 30 hours depending on what depth of domain is to be formed. By doing so, as illustrated in FIG. 8B, a domain 32a having a reduced depth $d_1$ is formed (second step).

Figure 8C:
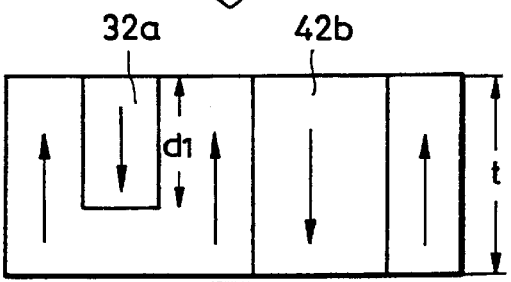

Subsequently, as illustrated in FIG. 8C, in another portion separate from the portion of the ferroelectric substrate 41 having the polarization inversion domain 32a formed therein, with a method similar to that executed in the above-described first step, etc., there is formed a polarization inversion domain 42b whose depth covers substantially the entire thickness t of the substrate 41 from one main surface thereof. It is to be noted that the formation position at which this polarization domain 42b is formed may partly overlap on the formation position at which the polarization inversion domain 32a is formed.

Subsequently, for example, the resulting substrate is annealed at a temperature not higher than the Curie temperature thereof, preferably 300 to 1150° C., in an atmospheric air or in an atmosphere of oxygen for a prescribed period of time (third step). In this case, also, the annealing time period is selected to be from 0 minute (instantaneous moment) to 30 hours depending on what depth of domain is to be formed.

Figure 8D:
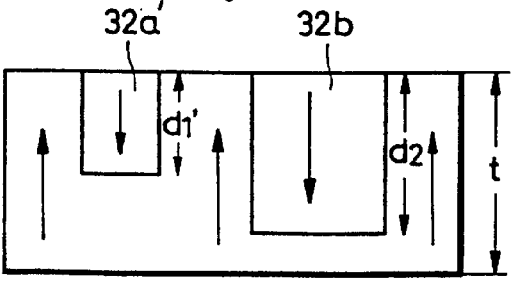

By doing as above, as illustrated in FIG. 8D, the depth $d_1$ of the domain 32a is reduced to a domain 32a' having a depth of $d_1'$, and simultaneously, the depth of the domain 42b is reduced, whereby a domain 32b having a depth of $d_2$ is formed (fourth step).

Incidentally, the depth of the polarization inversion domain after the respective annealing treatments performed in the second and the fourth step tends to become smaller with an increase in the temperature and with an increase in the annealing length of time. For example, when the annealing temperature is 1025° C., the depth of the polarization inversion domain becomes around ½ of the thickness t of the ferroelectric substrate in 3 hours. Also, the annealing treatment conditions in the first and the third step, i.e., the annealing temperature and time length may be mutually different or may be the same. Further, by repeatedly performing the above-described domain formation and annealing treatment, i.e., the first and third steps and the second and fourth steps, a plurality of times, it is possible to form in the ferroelectric substrate a plurality of the polarization inversion domains each having a different depth.

The configuration of the polarization inversion domain is not limited to a rectangular parallelepiped like configuration, and, by selectively determining the configuration of the electrode 46, the irradiation pattern of the charged particles, etc., can be made into, for example, a triangular-columnar, circular-columnar, etc. configuration. Further, the configuration of the electrode 44, 49 can also be made similarly into various configurations. The configuration, and the number, of the domain walls are not limited to those mentioned above, either.

Also, by irradiating charged particles having negative charge therewith other than the above-described electron beams, or by irradiating charged particles having positive charge therewith, for example, protons, onto the surface on the positive side of the spontaneous polarization of the domain, it is possible to form the domains.

Next, preferred embodiments of the present invention will be explained.

First Embodiment

A first embodiment will now be explained based on the present invention with reference to FIGS. 1 to 3.
<Construction of the Electro-optical Element>

Figure 2:
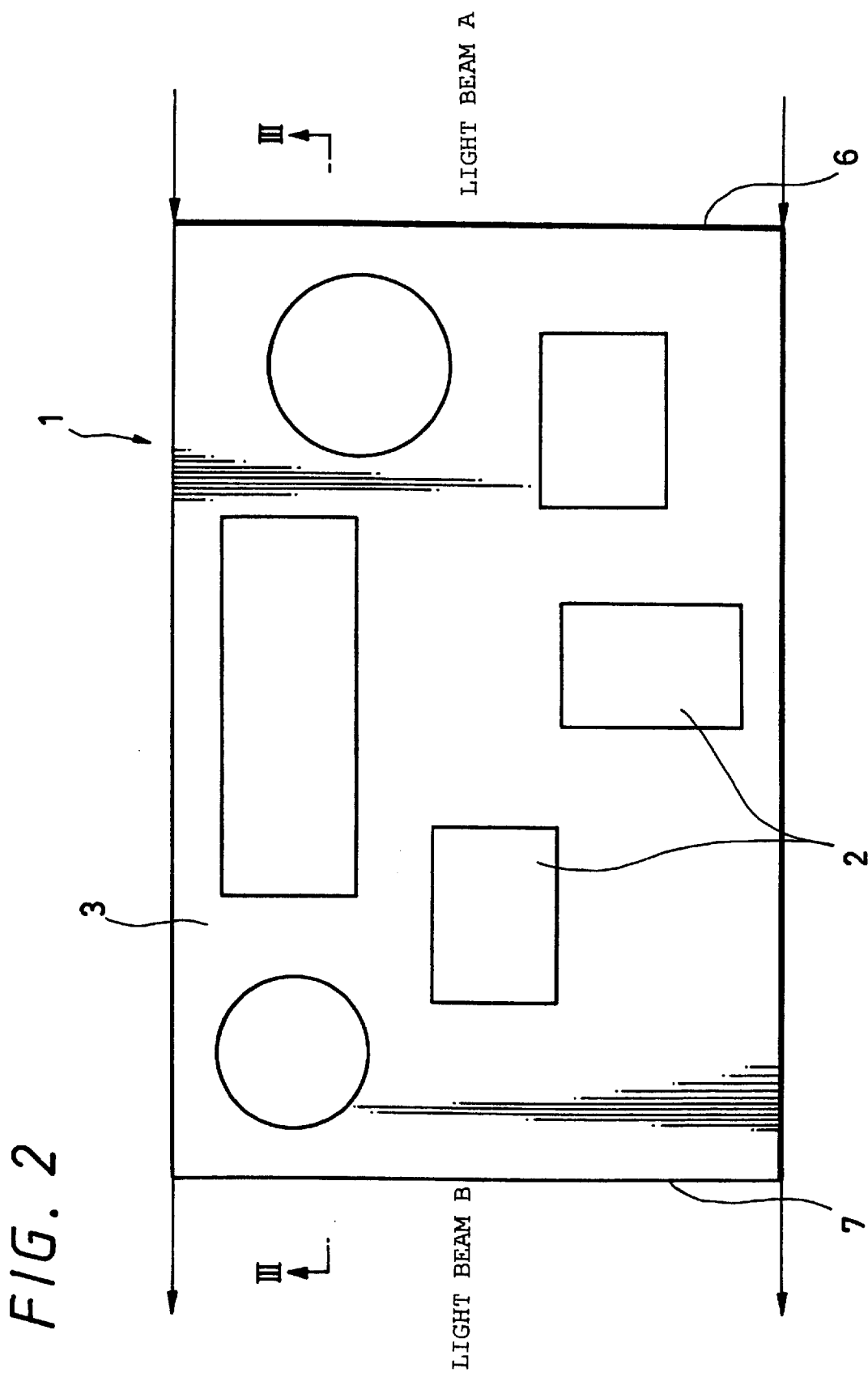
FIG. 2 is a schematic plan view illustrating the same.
Figure 3:
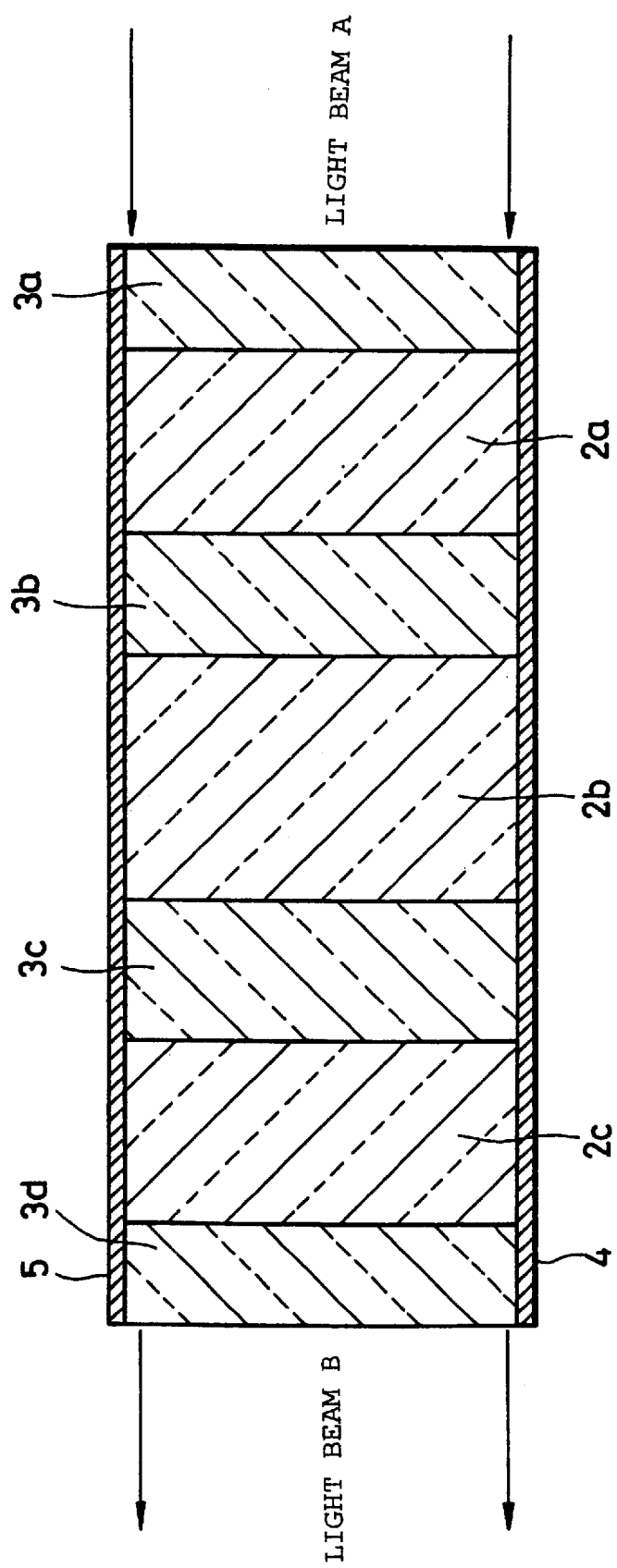
FIG. 3 is a schematic sectional view taken along a line III—III of FIG. 2.

As illustrated in FIGS. 1 to 3, an electro-optical element 1 according to this embodiment is constructed of a ferroelectric substrate 3 that is shaped like, for example, a plate, and that is made of lithium niobate, lithium tantalate, etc., polarization inversion domains 2 each having a prescribed configuration, which have been fabricated inside this ferroelectric substrate 3, and two electrodes 4 and 5 that have been fabricated on both main surfaces of the ferroelectric substrate 3. FIG. 2 is a plan view illustrating the upper surface of the ferroelectric substrate when excepting the electrodes 4 and 5.

It is arranged that between the electrodes 4 and 5 be applied from a power supply 8 a required electric signal for controlling a light beam.

A light beam A that enters into the ferroelectric substrate uses one side surface (end surface) 6 perpendicular to the main surface of the ferroelectric substrate 3 as a light incident surface 6, and the light beam A is input thereinto from this incident surface 6 in the direction indicated by the arrow x in the figure. Then, after having propagated through the ferroelectric substrate 3, the light beam A uses the other side surface (end surface) that opposes the incident surface 6, as a light outgoing surface 7, and the light beam A is output from this incident surface 7 as a light beam B. These both end surfaces 6 and 7 are optically ground into mirror surfaces.

Also, as illustrated in FIGS. 1 and 3, the polarization inversion domains 2 are irregularly formed in the propagation direction (the x direction in FIG. 1) of the light beam A. Further, these domains 2 are also irregularly formed in the direction (the y direction in FIG. 1) that intersects the propagation direction of the light beam A at right angles with respect thereto. Accordingly, during the propagation of the light beam A through the ferroelectric substrate 3, the light beam A passes through several domain walls. The number of the domain walls through which the light beam A passes, the angle of the light beam A at which this light beam A is incident upon the domain wall, and the propagation distance of the light beam A through the domain are each different every one of the light rays constituting the light beam. Also, in this embodiment, the domain walls are each substantially perpendicular to the main surface of the substrate 3.
<Operation of the Electro-optical Element>

In order to decrease the coherent characteristic of the light beam A, whose coherent characteristic is high, and thereby decrease the speckle noise and then cause the light beam B to go out, it is sufficient to randomly disturb, from the aspect of time, the phase of each of the light rays constituting the light beam propagating through the electro-optical element 1 every one of the light rays. The reason for this is as follows. Even in a case where the light rays constituting the light beam interfere with each other and this would originally cause the occurrence of speckle noises, if the phase of each of the light rays changes between each light rays from the aspect of time at the place where interference occurs, the interference conditions, i.e., the pattern with which interference occurs, or the pattern with which speckle occurs, changes from the aspect of time. Accordingly, when having looked at such pattern with the human naked eyes, since said change is integrated in terms of time due to the storage effect of the quantity of light that is the characteristic that is inherent in the naked eyes, the apparent effect of the interference, i.e., the speckle noises, disappear.

For example, when randomly forming in the electro-optical element 1 the polarization inversion domains 2 each having a random configuration as stated previously, it results that the light rays constituting the light beam A propagating through the ferroelectric substrate 3 differ from each other in the number of times with which they pass through the domain walls, the angles at which they enter into the domain wall, and the propagation distances over which they propagate through the domain. Further, for the additional reason that the difference in the refractive index between each of these domain portions and the other portion changes according to the electric field of the signal that has been applied between the electrodes 4 and 5 of the electro-optical element 1, the phase of each of the light rays constituting the light beam B after the passage of it through the electro-optical element 1 changes between each light rays from the aspect of time according to the electric field of the signal. As a result of this, the speckle noises decrease.

And, when the applied voltage is zero, the difference in the refractive index between the polarization inversion domain 2 (for example, the domains 2*a*, 2*b*, and 2*c* in FIG. 3) and the other portion, for example, the portions 3*a*, 3*b*, 3*c* and 3*d* in FIG. 3, becomes zeroed, with the result that the phases of the light rays constituting the light beam become completely regularly ordered. For this reason, in order to effectively decrease the speckle noises, it is preferable to apply the electric field of the signal that has been selected so that the voltage thereof does not become 0 volt, namely, an A.C. current signal having a D.C. current component superimposed thereon.

<Fabrication Method of the Electro-optical Element>

In the polarization inversion domain 2, for example, regarding the thickness direction of the plate-like ferroelectric substrate (the z direction in FIG. 1), by locally applying an electric field to the ferroelectric substrate that has uniform spontaneous polarization in one direct ion, it is possible to locally produce spontaneous polarization, whose characteristic is opposite to that of this uniform spontaneous polarization.

Also, as the formation method of the polarization inversion domain that forms, in the crystal of ferroelectric substrate 3 such as lithium niobate, the polarization inversion domain whose depth covers the entire thickness of the substrate as measured from one main surface thereof or ranges from this one main surface up to a midway position of this thickness, there can be applied a method of maintaining the substrate crystal at around the Curie temperature thereof for a long period of time, a method of diffusing protons into the substrate, the above-described method of applying a voltage between the electrodes formed on the both main surfaces of the substrate, a method of irradiating charged particles holding electric charge therewith onto at least one main surface of the substrate, etc.

The electrodes 4 and 5 constituting the ferroelectric substrate 3 are each formed by causing the adhesion of an electric conductor such as gold, copper, or aluminum onto each of the opposing main surfaces by the PVD method (physical vapor deposition: physical film-forming method) such as deposition, sputtering, etc. Regarding these electrodes 4 and 5 that have been formed on those both main surfaces, it is preferable that they be formed over an area large enough to have clamped therebetween the portion of the light beam propagating through the ferroelectric substrate 3 that is wanted to have speckle noises decreased therefrom. However, the electrode may be formed every one of the respective polarization inversion domains, whereby an electric signal that is different every domain is applied.

As a result of this, the ferroelectric substrate 3 functions to disturb the phase of each of the light rays constituting the light beam passing through the interior thereof, between each light rays, in correspondence with the signal level of the control signal that is applied to these electrodes 4 and 5. Accordingly, even when the light beam A is the one whose coherent characteristic is high, the light beam B that outgoes becomes the one whose coherent characteristic is decreased and which has less speckle noises.

Second Embodiment

Next, a second embodiment of the present invention will be explained with reference to FIG. 4.

<Construction of the Electro-optical Element>

Figure 4:
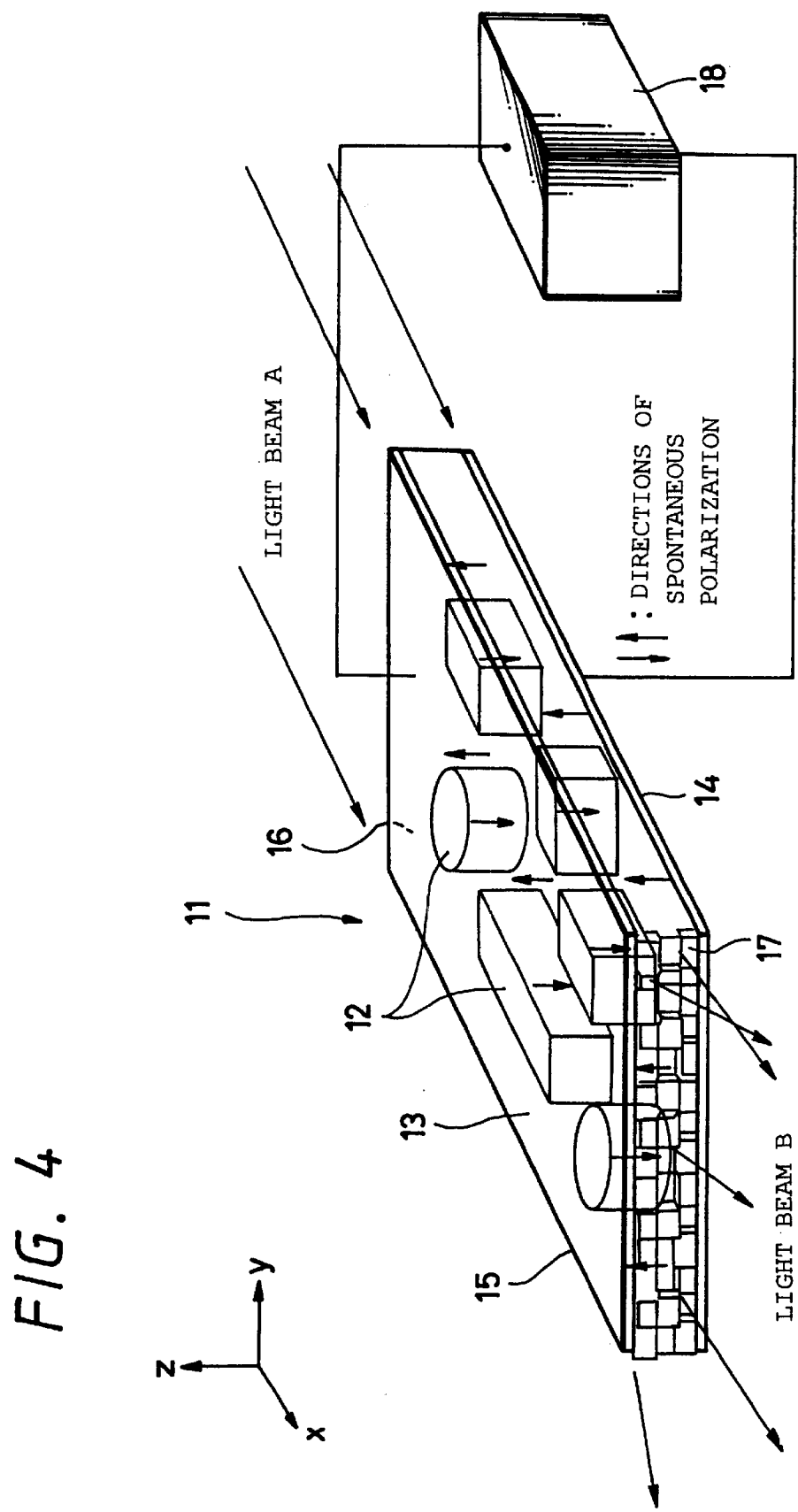
FIG. 4 is a schematic perspective view illustrating the electro-optical element according to the present invention.

As illustrated in FIG. 4, an electro-optical element 1 according to this embodiment is constructed of a ferroelectric substrate 13 that is made of lithium niobate, lithium tantalate, etc., polarization inversion domains 12 each having a prescribed configuration, which have been fabricated inside this ferroelectric substrate 13, and two electrodes 14 and 15 that have been fabricated on both main surfaces of the ferroelectric substrate 13.

It is arranged that between the electrodes 14 and 15 be applied from a power supply 18 a required electric signal for controlling a light beam.

A light beam A that enters into the ferroelectric substrate is input thereinto from a light incident surface 16, which is one of the surfaces perpendicular to the main surface of the ferroelectric substrate 13, in the direction indicated by the arrow x in FIG. 4. Then, after having propagated through the ferroelectric substrate 13, the light beam A is output from the other light outgoing surface 17. In this embodiment, the light incident surface 16 is optically ground into a mirror surface while the other light outgoing surface 17 has formed thereon fine concavities and convexities.

Also, the polarization inversion domains 12 are irregularly formed in the propagation direction (the x direction in FIG. 4) of the light beam A. Further, these domains 12 are also irregularly formed in the direction (the y direction in FIG. 4) that intersects the propagation direction of the light beam A at right angles with respect thereto. Accordingly, during the propagation of the light beam A through the ferroelectric substrate 13, the light beam A passes through several domain walls. The number of the domain walls through which the light beam A passes, the angle of the light beam A at which this light beam A is incident upon the domain wall, and the propagation distance of the light beam A through the domain are each different every one of the light rays constituting the light beam. Also, the domain walls are each substantially perpendicular to the main surface of the substrate 13.

<Operation of the Electro-optical Element>

In order to decrease the coherent characteristic of the light beam A, whose coherent characteristic is high and thereby decrease the speckle noises, it is sufficient to randomly disturb, from the aspect of time, the phase of each of the light rays constituting the light beam propagating through the electro-optical element 11 every one of the light rays, as stated before. Namely, as stated before, even in a case where the light rays constituting the light beam interfere with each other and this would originally cause the occurrence of speckle noises, by the phase of each of the light rays changing between each light rays from the aspect of time at the place where interference occurs, the interference conditions, i.e., the pattern with which interference occurs, or the pattern with which speckle occurs, changes from the aspect of time. Accordingly, when having looked at such pattern with the human naked eyes, due to the characteristic that is inherent in the naked eyes, the speckle noises disappear.

And, in this embodiment, also, when randomly forming in the electro-optical element 11 the polarization inversion domains 12 each having a random configuration as stated previously, it results that the light rays constituting the light beam propagating through the ferroelectric substrate 13 differ from one another in the number of times with which they pass through the domain walls, the angles at which they enter into the domain wall, and the propagation distances over which they propagate through the domain. Further, for the additional reason that the difference in the refractive index between each of these domain portions and the other portion changes according to the electric field of the signal that has been applied between the electrodes 14 and 15 of the electro-optical element 11, the phase of each of the light rays constituting the light beam after the passage of it through the electro-optical element 11 changes between each light rays from the aspect of time according to the electric field of the signal. As a result of this, the speckle noises decrease.

Incidentally, in this second embodiment, by having applied the fine concavities and convexities to the light outgoing surface of the electro-optical element 11, since the wave front of each portion of the light waves is disturbed by these concavities and convexities, the A.C. current signal that is to be applied can be also made to be an A.C. current signal having no D.C. current components superimposed thereon.

<Fabrication Method of the Electro-optical Element>

The electro-optical element can be fabricated using the identical method with that according to the first embodiment. Namely, in the polarization inversion domain 12, for example, regarding the thickness direction (the z direction in FIG. 4), by locally applying an electric field to the ferroelectric substrate 13 that has uniform spontaneous polarization in one direction, it is possible to locally produce spontaneous polarization, whose characteristic is opposite to that of this uniform spontaneous polarization.

Also, as the formation method of the polarization inversion domain that forms, in the crystal of ferroelectric substrate 3 such as lithium niobate, lithium tantalate, etc., the polarization inversion domain whose depth covers the entire thickness of the substrate as measured from one main surface thereof or ranges from this one main surface up to a midway position of this thickness, there can be applied a method of maintaining the substrate crystal at around the Curie temperature thereof for a long period of time, a method of diffusing titanium and protons into the substrate, the method of applying a voltage between the electrodes formed on the both main surfaces of the substrate, a method of irradiating charged particles holding electric charge therewith onto at least one main surface of the substrate, etc.

The electrodes 14 and 15 constituting the ferroelectric substrate 13 are each formed by causing the adhesion of an electric conductor such as gold, copper, or aluminum onto each of the opposing main surfaces by the PVD method such as deposition, sputtering, etc. Regarding these electrodes 14 and 15 that have been formed on those both main surfaces, it is preferable that they be formed over an area large enough to have clamped therebetween the portion of the light beam propagating through the ferroelectric substrate 13 that is wanted to have speckle noises decreased therefrom. However, the electrode may be formed every one of the respective polarization inversion domains, whereby an electric signal that is different every domain is applied.

As a result of this, the ferroelectric substrate 13 functions to disturb the phase of each of the light rays constituting the light beam passing through the interior thereof, between each light rays, in correspondence with the signal level of the control signal that is applied to these electrodes 14 and 15. Accordingly, even when the light beam A is the one whose coherent characteristic is high, the light beam B that outgoes becomes the one whose coherent characteristic is: decreased and which has less speckle noises.

Also, while fine concavities and convexities are applied to the light outgoing surface 17 of the electro-optical element 11, these concavities and convexities can be formed by grinding the light outgoing surface 17 with relatively coarse particles.

Third Embodiment

Next, a third embodiment of the present invention will now be explained with reference to FIG. 5.

<Construction of the Electro-optical Element>

Figure 5:
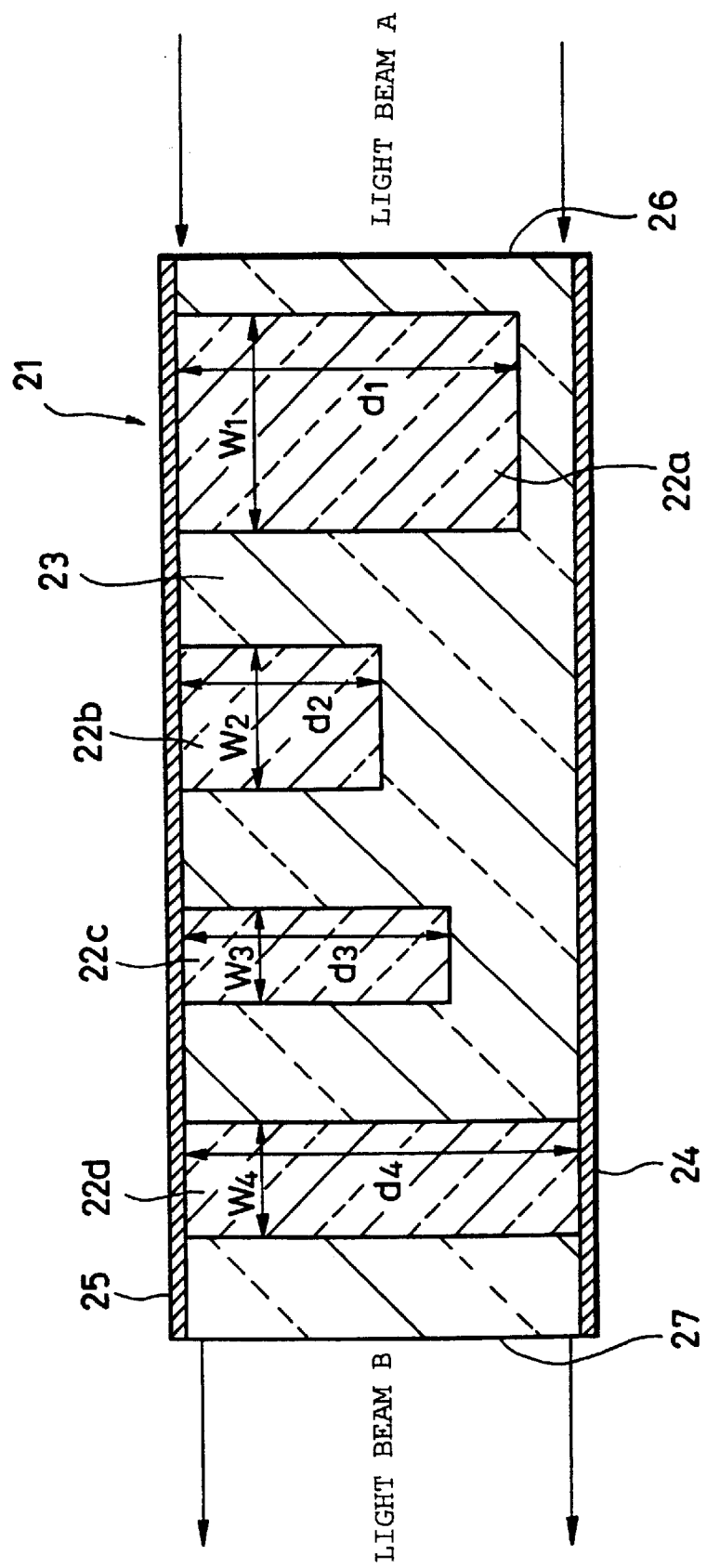
FIG. 5 is a schematic sectional view illustrating the electro-optical element according to the present invention.

As illustrated in FIG. 5, an electro-optical element 21 according to this embodiment is constructed of a ferroelectric substrate 23 that is made of lithium niobate, lithium tantalate, etc., polarization inversion domains 22a, 22b, 22c, and 22d each having a prescribed configuration, which have been fabricated inside this ferroelectric substrate 23, and two electrodes 24 and 25 that have been fabricated on both main surfaces of the ferroelectric substrate 23.

Also, it is arranged that between the electrodes 24 and 25 be applied from a power supply (not illustrated) a required electric signal for controlling a light beam.

A light beam A that enters into the ferroelectric substrate is input thereinto from a light incident surface 26, which is one of the side surfaces perpendicular to the main surface of the ferroelectric substrate 23. Then, after having propagated through the ferroelectric substrate 23, the light beam A is output from the light outgoing surface 27 that is the other side surface as the light beam B. Also, the light incident surface 26 and the outgoing surface 27 are each optically ground into a mirror surface.

Also, the polarization inversion domains 22a, 22b, 22c, and 22d are irregularly formed in the propagation direction of the light beam A. Further, these domains are also irregularly formed in the direction that intersects the propagation direction (not illustrated) of the light beam A at right angles with respect thereto. Accordingly, during the propagation of the light beam A through the ferroelectric substrate 23, the light beam A passes through several domain walls. The number of the domain walls through which the light beam A passes, the angle of the light beam A at which this light beam A is incident upon the domain wall, and the propagation distance of the light beam A through the domain are each different every one of the light rays constituting the light beam. Also, the domain walls are each substantially perpendicular to the main surface of the substrate 23. Namely, the polarization inversion domains 22a, 22b, 22c, and 22d are each different from one another not only in the length w as viewed in the propagation direction of the light beam and the depth but also, although not illustrated, further in the lateral width, such as, for example, as illustrated, the polarization inversion domain 22a has a length $w_1$ and a depth $d_1$; the polarization inversion domain 22b has a length $w_2$ and a depth $d_2$; the polarization inversion domain 22c has a length $w_3$ and a depth $d_3$; and the polarization inversion domain has a length $w_4$ and a depth $d_4$. Namely, these polarization inversion domains are each randomly formed.

<Operation of the Electro-optical Element>.

In order to decrease the coherent characteristic of the light beam A, whose coherent characteristic is high and thereby cause the light beam B having decreased the speckle noises therefrom to go out, there is randomly disturbed, from the aspect of time, the phase of each of the light rays constituting the light beam that propagates every one of the light rays. Namely, as in the above-described embodiment, even in a case where the light rays constituting the light beam interfere with each other and this would originally cause the occurrence of speckle noises, by the phase of each of the light rays changing between each light rays from the aspect of time at the place where interference occurs, the interference conditions, i.e., the pattern with which interference occurs, or the pattern with which speckle occurs, changes from the aspect of time. Accordingly, when having looked at such pattern with the human naked eyes, due to the characteristic that is inherent in the naked eyes, the speckle noises disappear.

When randomly forming in the electro-optical element 21 the polarization inversion domains 22a, 22b, 22c, and 22d each having a random configuration as in this embodiment, it results that the light rays constituting the light beam propagating through the ferroelectric substrate 23 differ from one another in the number of times with which they pass through the domain walls, the angles at which they enter into the domain wall, and the propagation distances over which they propagate through the domain. Further, for the additional reason that the difference in the refractive index between each of these domain portions and the other portion changes according to the electric field of the signal that has been applied between the electrodes 24 and 25 of the electro-optical element 21, the phase of each of the light rays constituting the light beam B after the passage of it through the electro-optical element 21 changes between each light rays from the aspect of time according to the electric field of the signal. As a result of this, the speckle noises decrease.

In each of the above-described preceding embodiments, reference was made to a case where the depth of the polarization inversion domain was made to be a depth that ranged from one main surface of the ferroelectric substrate to the other main surface thereof. In this case, among the light rays constituting the light beam, there is the possibility that the phases of some part thereof will be regularly arranged between each light rays in the depth direction of the ferroelectric substrate. However, when forming the fine concavities and convexities on at least one of the incident and outgoing surfaces of the electro-optical element as in the second embodiment, it is possible to suppress the regular arrangement of these phases between each light rays.

In contrast to this, the polarization inversion domains in this embodiment are such that the depths d of the respective domains 22 formed inside the ferroelectric substrate 23 are irregularly formed. In this case, because it is possible to cause a change of the difference in refractive index between each light rays also in the depth direction of the ferroelectric substrate 23, it is possible to avoid the inconvenience that the phases of the respective constituent light rays will be regularly arranged between each light rays in the depth direction of the light beam.

<Fabrication Method of the Electro-optical Element>

In the polarization inversion domain, regarding the thickness direction, by locally applying an electric field to the ferroelectric substrate that has uniform spontaneous polarization in one direction, it is possible to locally produce spontaneous polarization, whose characteristic is opposite to that of this uniform spontaneous polarization. It is to be noted that, in order to form the polarization inversion domains each having a random depth in the depth direction of the ferroelectric substrate, there can be applied the above-described method that is illustrated in FIGS. 6 to 8.

The electrodes constituting the ferroelectric substrate are each formed by causing the adhesion of an electric conductor such as gold, copper, or aluminum onto each of the opposing main surfaces by the above-described PVD method such as deposition, sputtering, etc. Regarding these electrodes that have been formed on those both main surfaces, it is preferable that they be formed over an area large enough to have clamped therebetween the portion of the light beam propagating through the ferroelectric substrate that is wanted to have speckle noises decreased therefrom. However, in a case where forming a plurality of the polarization inversion domains, the electrode can also be formed every one of the respective polarization inversion domains, whereby an electric signal that is different every domain is applied.

As a result of this, the ferroelectric substrate 23 functions to disturb the phase of each of the light rays constituting the light beam passing through the interior thereof, between each light rays, in correspondence with the signal level of the control signal that is applied to these electrodes 24 and 25. Accordingly, even when the light beam A is the one whose coherent characteristic is high, the light beam B that outgoes becomes the one whose coherent characteristic is decreased and which therefor has less speckle noises.

Further, in this embodiment, also, at least one end surface of the light incident and outgoing surfaces of the electro-optical element can be made to be a fine concavities-and-convexities surface.

According to each of the above-described respective embodiments, it is possible to disturb the phase relationship within the light beam from the aspect of time, to thereby effectively decrease the coherent characteristic of the light beam, and to thereby sufficiently erase the speckles. Further, since the element does not need to use any movable portions such as a motor, it is possible to miniaturize the element and also to sufficiently suppress the power consumption small.

Accordingly, the phase relationship of the light beam, whose coherent characteristic is high, such as laser light is disturbed, with the result that the light beam whose coherent characteristic has been decreased is easily obtained by the optical element that has a simple construction. The light beam, whose coherent characteristic has been decreased in this way, especially laser light, can be utilized, for example, as a light source for the illumination light of a projector apparatus, etc., or as a light source for a laser display, etc.

In each of the above-described respective embodiments, reference has been made to a case where the electro-optical element is constituted by a single piece of ferroelectric substrate; the mutually opposing end surfaces have been made to be the incident surface and outgoing surface of the light beam respectively; and the propagation direction of the light beam has been made to be the direction that goes along the main surfaces. However, the electro-optical element of the present invention is not limited to this construction.

Namely, for example, as have their schematic sectional views shown in FIGS. 9 to 17, various modified embodiments can be adopted, which include the one wherein the both main surface sides of the ferroelectric substrate having formed therein the polarization inversion domains are made to be the incident surface and outgoing surface of the light beam, respectively, the one wherein one main surface is made to be the incident surface and the outgoing surface of the light beam, and the one wherein a plurality of ferroelectric substrates each having the. polarization inversion domains formed therein are laminated to construct one piece of electro-optical element.

Figure 9:
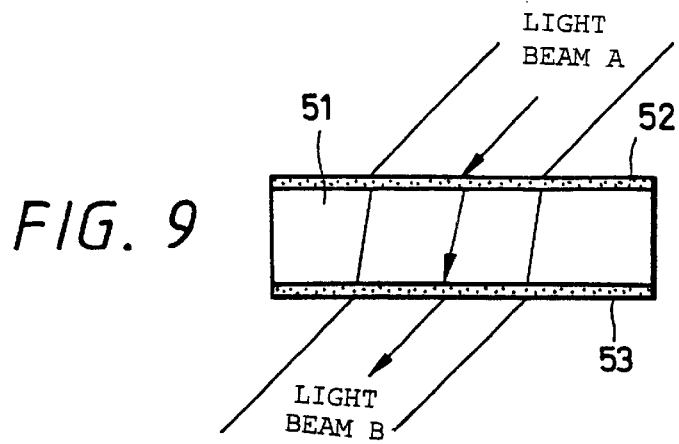
FIG. 9 is a schematic sectional view illustrating the electro-optical element according to the present invention.

For example, as illustrated in FIG. 9, opposing electrodes 52 and 53 that each are made of a transparent conductive film such as, for example, an ITO (indium tin oxide) film are formed, by adhesion, on the both main surfaces of the ferroelectric substrate 51 having formed therein the polarization inversion domains (not illustrated). Then, these electrodes 52 and 53 are made to be the incident surface of an incident light beam A and the outgoing surface of an outgoing light beam B, respectively. Namely, in this case, the propagation direction of the light through the ferroelectric substrate 51 is made to be the thickness direction, or a direction going substantially along the thickness direction, of the ferroelectric substrate 51.

Figure 10:
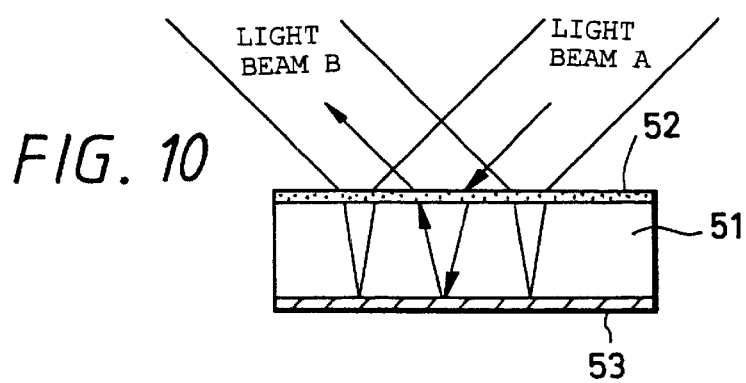
FIG. 10 is a schematic sectional view illustrating the electro-optical element according to the present invention.

Or, as illustrated in FIG. 10, the electrode 52 that consists of a transparent electrode is formed on one main surface of the ferroelectric substrate 51 having formed therein the polarization inversion domains (not illustrated), and this electrode 52 side is used both as the incident surface of the light beam and as the outgoing surface of the outgoing light beam B. And the electrode 53 that has a high reflectance and that is made of, for example, Al is formed on the other main surface by adhesion. Thereby, the incident beam is reflected by this electrode 53 in the interior of the ferroelectric substrate 51. The length of the optical path is thereby made greater than in the case of FIG. 9. A construction that is made like this is also possible.

Figure 11:
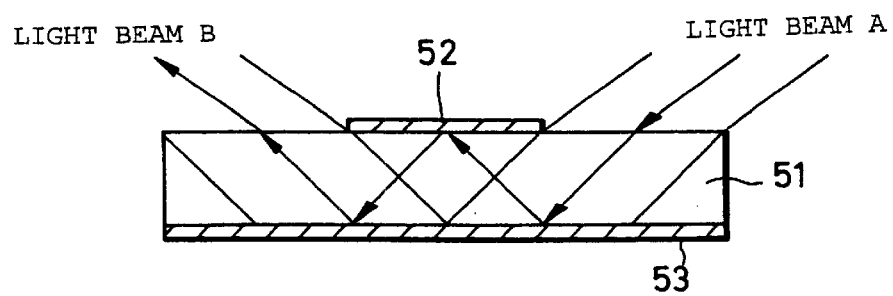
FIG. 11 is a schematic sectional view illustrating the electro-optical element according to the present invention.

Also, as an another alternative, as illustrated in FIG. 11, the both electrodes 52, 53 are each made to be an electrode having a high reflectance, which is made of, for example, Al. And the electrode 52 is formed on a part of one main surface of the ferroelectric substrate 51, and the both sides of the disposition location of this electrode 52 are used as the incident surface of the light beam A and as the outgoing surface of the light beam B, respectively. Namely, in this case, there is provided a construction wherein the light beam that has entered into the ferroelectric substrate 1 is reflected by the inner surfaces of the both electrodes 52 and 53, whereby the light beam is reciprocated twice or more in the thickness direction of the ferroelectric substrate 51 to thereby increase the length of the optical path thereof.

Figure 12:
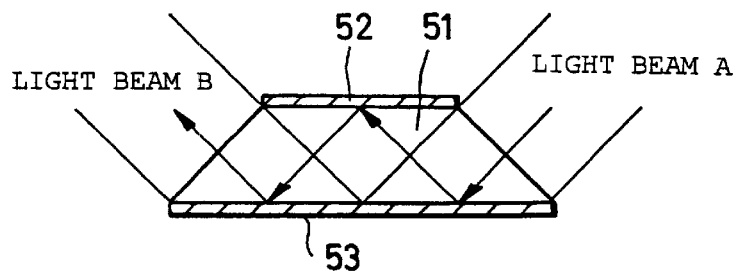
FIG. 12 is a schematic sectional view illustrating the electro-optical element according to the present invention.

Also, an example that is illustrated in FIG. 12 concerns a case where the mutually opposing side surfaces that adjoin to the main surface of the ferroelectric substrate 51 are each made to be an inclined surface, for example, the substrate 51 is made trapezoidal in section, the respective inclined surfaces being made to be the incident surface and the outgoing surface, respectively. In this case, also, it is arranged that the light beam that has entered into the ferroelectric substrate 51 be reflected by the inner surfaces of the both electrodes 52 and 53 to thereby increase the length of the optical path compared to the case of FIG. 9.

In each of these examples illustrated in FIGS. 9 to 12, the above-described driving method is used. Namely, by applying the above-described required electric signal between the both electrodes 51 and 52, it is possible to take out the light beam B that has been prepared by decreasing the coherent characteristic of the light beam A.

Further, each of examples illustrated in FIGS. 13 to 17 concerns a case where the electro-optical element is formed by a laminate 60 that has been prepared by laminating a plurality of ferroelectric substrates 51 each having formed therein the polarization inversion domains (not illustrated).

Figure 13:
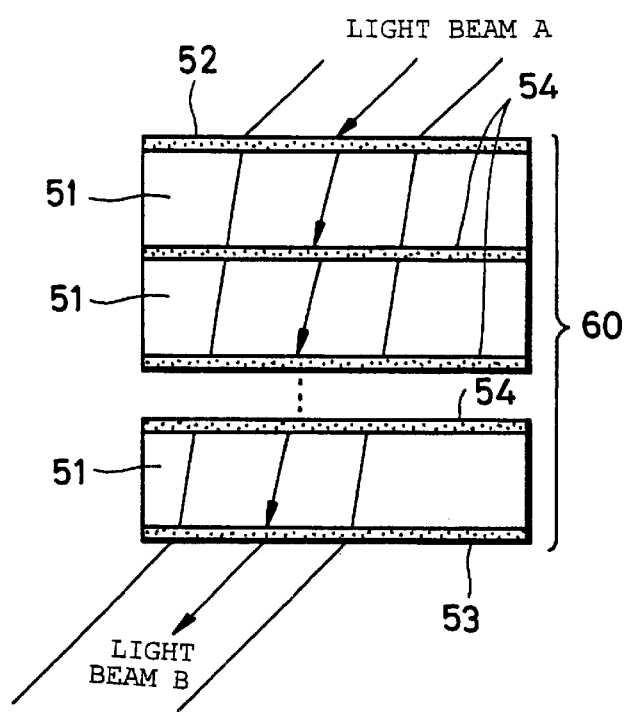
FIG. 13 is a schemnatic sectional view illustrating the electro-optical element according to the present invention.

In the example illustrated in FIG. 13, there is shown a case where a transparent electrode 52 and a transparent electrode 53 are respectively disposed on the main surfaces on the outer sides of the ferroelectric substrates 51 that are located on the both outer sides of the laminate 60 that has been prepared by laminating a plurality of the ferroelectric substrates 51. And, in this case shown, an intermediate electrode 54 consisting of a transparent electrode is disposed between each two of these ferroelectric substrates 51.

And, the electrode 52 side is used as the incident surface of the light beam A, and the other electrode 53 side is used as the outgoing surface of the light beam B.

Figure 14:
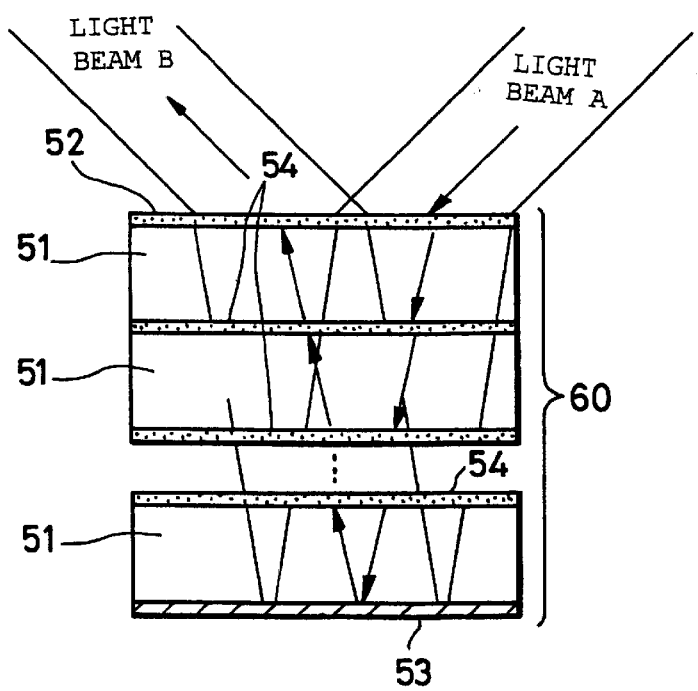
FIG. 14 is a schematic sectional view illustrating the electro-optical element according to the present invention.

Also, FIG. 14 concerns a case where, in the construction of FIG. 13, the electrode 53 is made to be an electrode having a high reflectance and the electrode 52 side is used both as the incident surface of the light beam A and as the outgoing surface of the light beam B. And in this case the light is reciprocated in the lamination direction of the laminate 60 by being reflected by the inner surface of the electrode 53.

Figure 15:
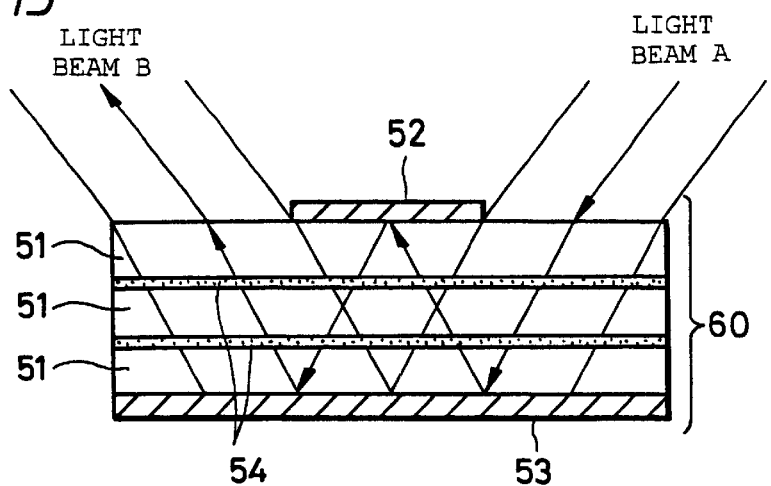
FIG. 15 is a schematic sectional view illustrating the electro-optical element according to the present invention.

In the example illustrated in FIG. 15, there is shown a case where the electrodes 51 and 52 on the both surfaces of the laminate 60 are each made to be an electrode having a high reflectance such as that made of Al. And, in this case shown, the electrode 52 is formed on a part of one main surface of the ferroelectric substrate 51, and, the both sides of the disposition location of this electrode 52 are respectively used both as the incident surface of the light beam A and as the outgoing surface of the light beam B. In this case, also, the light beam is reflected by the inner surfaces of the both electrodes so that the light beam can be reciprocated twice or more in the thickness direction of the laminate 60.

Figure 16:
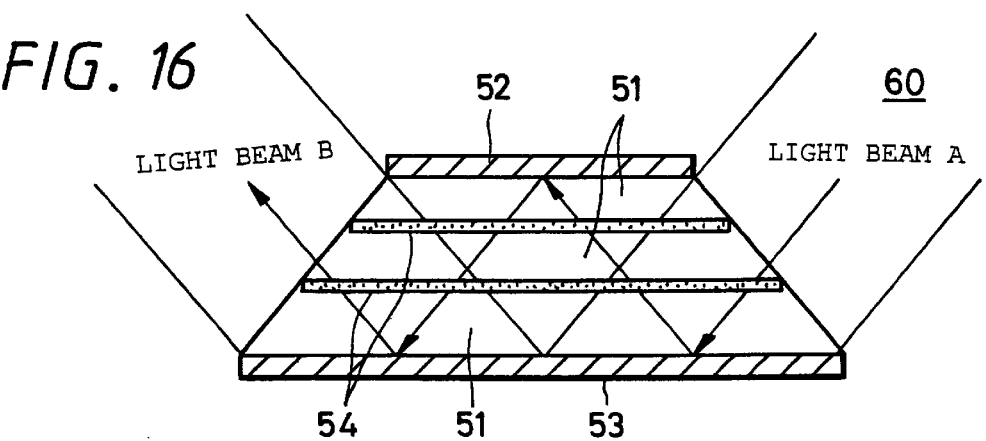
FIG. 16 is a schematic sectional view illustrating the electro-optical element according to the present invention.

Also, FIG. 16 concerns a case where in the construction of FIG. 15 the mutually opposing side surfaces of the laminate 60 are each made to be an inclined surface, for example, made trapezoidal in section, the respective inclined surfaces being made to be the incident surface and the outgoing surface, respectively. In this case, also, it is arranged that the light beam that has entered into the ferroelectric substrate 51 be reflected by the inner surfaces of the both electrodes 52 and 53 to thereby increase the length of the optical path.

Figure 17:
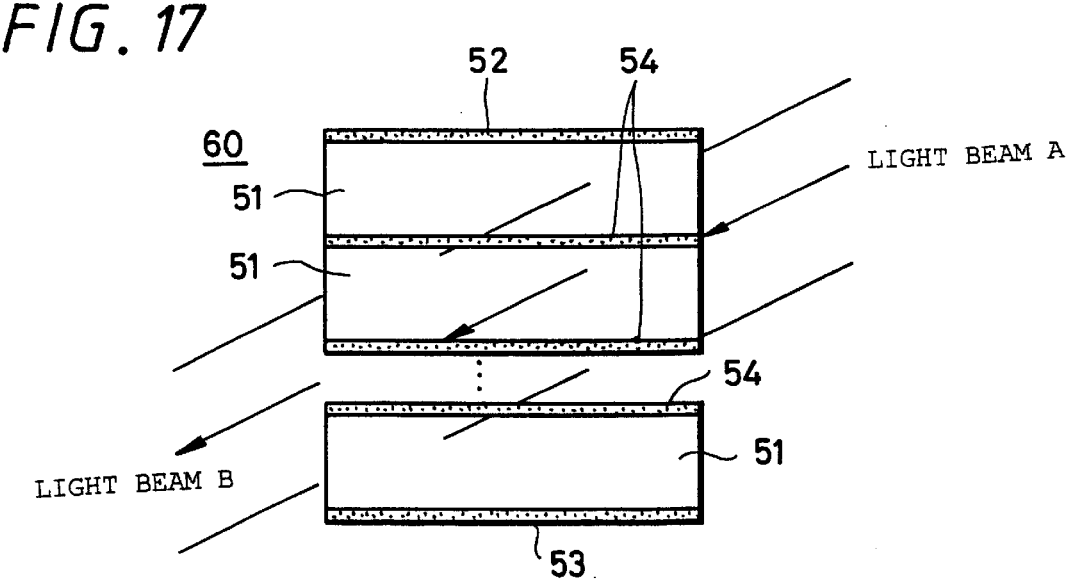
FIG. 17 is a schematic sectional view illustrating the electro-optical element according to the present invention .

Further, FIG. 17 concerns a case where the mutually opposing side surfaces of the laminate 60 are made to be the incident surface and the outgoing surface of the light, respectively. And, in this case, each of the respective electrodes is constituted by a transparent electrode.

When adopting the laminated structures illustrated in FIGS. 13 to 17, the above-described electric signal is applied to each surface of each of the ferroelectric substrates 51 so that this surface may sequentially have a reversed polarity. By doing so, as stated previously, it is possible to cause the occurrence of a phase shift between each light rays constituting the light beam and thereby to decrease the coherent characteristic of the light beam B compared to the light beam A.

Incidentally, the electro-optical element, the driving method thereof, and the manufacturing thereof according to the present invention are not limited to the examples that have been stated above.

Additionally, in the driving method of the present invention, the prescribed signal that is applied to the electrodes may be not only the A.C. current signal having D.C. current components superimposed thereon and an ordinary A.C. current signal, both of which have been stated above, but also, for example, a pulse shaped signal or a D.C. current signal.

Regarding the electric signal, the frequency is, for example, 30 Hz or more, which is the speed that can no longer be discriminated with the human naked eyes. Also, the frequency can also be made to be a frequency that can conform to the frames number (30 frames per second) in accordance with the currently used NTSC system. Also, the frequency does not need to be a frequency whose value is one in number. Also, regarding the voltage of the electric signal that is applied, although no particular limitation is imposed thereon, as the level of a minimum voltage thereof, it is preferable to apply a voltage that meets the equation (1) that is expressed as follows.

$$(1/\lambda) \times E \times n^3 \times r \times \{(\text{the propagation distance of the light ray at the domain portion where the propagation distance thereof is the longest}) - (\text{the propagation distance of the light ray at the domain portion where the propagation distance thereof is the shortest})\} > 1/2 \qquad (1)$$

(where the $\lambda$: the wavelength of the light;
the E: the applied electric field (=the applied voltage / the thickness of the substrate);

the n : the refractive index of the substrate; and the r : the electro-optical constant).

This means applying a voltage at which the maximum one of the phase differences among the light rays constituting the respective light beams inside the element becomes λ/2 (=π) or more.

Also, the configuration of the polarization inversion domain may be polygonal such as triangular-columnar, star-shaped-columnar, etc., not, as stated above, circular-columnar or columnar.

Further, it is also possible to dispose a polarizer on the incident side of the light beam and an analyzer on the outgoing side thereof, or to dispose only either a polarizer or an analyzer.

Also, it is possible to construct the electro-optical element of the present invention by a transmission type wavelength filter and a light intensity modulator and arrange these members in series and thereby to simultaneously perform the phase matching and intensity modulation of the light beam.

Further, while the lithium niobate that has been used as the ferroelectric substrate is a compound that is represented by $LiNbO_3$ and that consists of a crystal of $LiNb_x Ta_{1-x}$ (where $0 \leq x \leq 1$), it is besides possible to additionally use known ferroelectric crystal such as lithium tantalate ($LiTiTaO_3$) or KTP ($KTiOPO_4$), as the ferroelectric substrate.

As has been described above, according to the electro-optical element of the present invention, there is provided the phase displacement means for randomly differentiating the phase of each of the light rays constituting the light beam between each light rays within the passing section of the ferroelectric substrate through which the light beam passes. Namely, regarding the light beam which propagates through the ferroelectric substrate and whose coherent characteristic is high, a difference in refractive index, and additionally a change in time, is caused to occur between the polarization inversion domain and the ferroelectric substrate with the use of the driving method of the present invention, to thereby effectively convert each and every one of the light rays constituting the light beam to the one whose phase is different from that of another one between each two of them. Accordingly, it is possible to obtain the light beam whose coherent characteristic has been decreased from that of the incident light beam, effectively.

As a result of this, it is possible to sufficiently decrease the speckle noises. Further, since no movable portions such as a motor are necessary, it is possible to miniaturize the device and also to suppress the power consumption sufficiently small.

Also, according to the manufacturing method of the present invention, when manufacturing the above-described electro-optical element of the present invention, there are executed the process steps of forming the first polarization inversion domain in the ferroelectric substrate and reducing this domain to a prescribed depth, and then forming the second polarization inversion domain again. As a result of this, it is possible to manufacture the electro-optical element having the polarization inversion domains that are irregular in the depth direction thereof, with a high reproducibility.

What is claimed is:

1. An electro-optical element including a ferroelectric substrate having an electro-optical effect, at least a pair of electrodes for applying an electric field to the ferroelectric substrate, and surfaces, wherein a plurality of polarization inversion domains are formed in a light beam propagation path within the ferroelectric substrate that is between an incident surface and an outgoing surface of a light beam of the ferroelectric substrate, one or both of the incident surface and outgoing surface are formed as a roughened surface, and at least a part of a surface of the ferroelectric substrate includes a reflection surface formed thereon;

and a phase displacement means for irregularly differentiating the phase of each of the light rays constituting the light beam between each light rays is constituted by the polarization inversion domains.

2. An electro-optical element including a laminate that is formed by laminating a plurality of ferroelectric substrates each having an electro-optical effect one over another, electrodes being respectively formed between lamination layers, each constituted by the ferroelectric substrates, of the laminate and on outermost side surfaces of the laminate, and the electrodes that have been disposed at least between the lamination layers being each constituted by a transparent electrode, and the laminate having formed thereon an incident surface and an outgoing surface of a light beam, wherein a plurality of polarization inversion domains are formed in a light beam propagation path within the ferroelectric substrate that is between the incident surface and outgoing surface of the light beam, one or both of the incident surface and outgoing surface are formed as a roughened surface, and at least a part of a surface of the ferroelectric substrate includes a reflection surface formed thereon;

and phase displacement means for irregularly differentiating the phase of each of the light rays constituting the light beam between each light rays is constituted by the polarization inversion domains.

3. An electro-optical element according to claim 1 or 2, characterized in that the plurality of polarization inversion domains are irregularly formed at least in the propagation direction of the light beam.

4. An electro-optical element according to claim 1 or 2, characterized in that the plurality of the polarization inversion domains are irregularly formed in a direction substantially perpendicular to the propagation direction of the light beam.

5. An electro-optical element according to claim 1 or 2, characterized in that depths of a plurality of the polarization inversion domains are irregularly formed.

6. An electro-optical element according to claim 1 or 2, characterized in that it has been arranged that the light beam passes through at least two domain walls of the polarization inversion domains.

7. An electro-optical element according to claim 1 or 2, characterized in that at least one of domain walls of the polarization inversion domains is formed perpendicularly or substantially perpendicularly to a surface on which the electrodes are formed.

8. An electro-optical element according to claim 1, characterized in that at least one of the electrodes is constituted by a transparent electrode, whereby it is arranged that at least one of the incidence and the outgo of the light beam is made through the transparent electrode.

9. An electro-optical element according to claim 2, characterized in that at least one of the electrodes that have been disposed on the outermost side of the laminate is constituted by a transparent electrode, whereby it is arranged that at least one of the incidence and the outgo of the light beam is made through the transparent electrode.

10. A method of driving an electro-optical element which includes a ferroelectric substrate having an electro-optical effect and at least a pair of electrodes for applying an electric field to the ferroelectric substrate and in which an incident surface and an outgoing surface of a light beam are formed on the ferroelectric substrate, with one or both of the incident surface and outgoing surface being formed as a roughened surface, and at least a part of the surface of the ferroelectric substrate includes a reflection surface formed thereon; a plurality of polarization inversion domains are formed in a light beam propagation path in the interior of the ferroelectric substrate that is between the incident surface and the outgoing surface of the light beam; and phase displacement means for irregularly differentiating the phase of each of the respective light rays constituting the light beam between each light rays is constituted by the polarization inversion domains, comprising:

supplying a required electric signal between the electrodes.

11. A method of driving an electro-optical element which includes a laminate that is formed by laminating a plurality of ferroelectric substrates each having an electro-optical effect one over another and in which electrodes are respectively formed between lamination layers, each constituted by the ferroelectric substrates, of the laminate and on outermost side surfaces of the laminate; the electrodes that have been disposed at least between the lamination layers are each constituted by a transparent electrode; the laminate has formed thereon an incident surface and an outgoing surface of a light beam, with one or both of the incident surface and outgoing surface being formed as a roughened surface, and at least a part of the surface of the ferroelectric substrate includes a reflection surface formed thereon; a plurality of polarization inversion domains are formed in a light beam propagation path within the ferroelectric substrate that is between the incident surface and outgoing surface of the light beam; and phase displacement means for irregularly differentiating the phase of each of the respective light rays constituting the light beam between each light rays is constituted by the polarization inversion domains, comprising:

supplying a required electric signal between the electrodes.

12. A method of driving an electro-optical element according to claim 10 or 11, characterized in that an A.C. current signal is supplied to the electrodes.

13. A method of driving an electro-optical element according to claim 10, or 11, characterized in that an A.C. current signal having a D.C. current component superimposed thereon is supplied to the electrode.

14. A method of manufacturing an electro-optical element which includes a ferroelectric substrate having an electro-optical effect and at least a pair of electrodes for applying an electric field to the ferroelectric substrate and in which an incident surface and an outgoing surface of a light beam are formed on the ferroelectric substrate, with one or both of the incident surface and outgoing surface being formed as a roughened surface, and at least a part of the surface of the ferroelectric substrate includes a reflection surface formed thereon; a plurality of polarization inversion domains are formed in a light beam propagation path in the interior of the ferroelectric substrate that is between the incident surface and the outgoing surface of the light beam; and phase displacement means for irregularly differentiating the phase of each of the respective light rays constituting the light beam between each light rays is constituted by the polarization inversion domains, including:

a first step for forming a first polarization inversion domain in a part of the ferroelectric substrate, from one main surface thereof, wholly, or partly, in a thickness direction of the ferroelectric substrate;

a second step for maintaining the ferroelectric substrate to be at a prescribed temperature not higher than the Curie temperature thereof for a prescribed period of time to thereby reduce the depth of the first polarization inversion domain; and a third step for forming a second polarization inversion domain in another part of the ferroelectric substrate, from one main surface thereof, wholly, or partly, in the thickness direction of the ferroelectric substrate.

15. A method of manufacturing an electro-optical element which includes a laminate that is formed by laminating a plurality of ferroelectric substrates each having an electro-optical effect one over another and in which electrodes are respectively formed between lamination layers, each constituted by the ferroelectric substrates, of the laminate and on outermost side surfaces of the laminate; the electrodes that have been disposed at least between the lamination layers are each constituted by a transparent electrode; the laminate has formed thereon an incident surface and an outgoing surface of a light beam, with one or both of the incident surface and outgoing surface being formed as a roughened surface, and at least a part of the surface of the ferroelectric substrate includes a reflection surface formed thereon; a plurality of polarization inversion domains are formed in a light beam propagation path within the ferroelectric substrate that is between the incident surface and outgoing surface of the light beam; and phase displacement means for irregularly differentiating the phase of each of the respective light rays constituting the light beam between each light rays is constituted by the polarization inversion domains, including:

a first step for forming a first polarization inversion domain in a part of the ferroelectric substrate, from one main surface thereof, wholly, or partly, in a thickness direction of the ferroelectric substrate;

a second step for maintaining the ferroelectric substrate to be at a prescribed temperature not higher than the Curie temperature thereof for a prescribed period of time to thereby reduce the depth of the first polarization inversion domain; and a third step for forming a second polarization inversion domain in another part of the ferroelectric substrate, from one main surface thereof, wholly, or partly, in the thickness direction of the ferroelectric substrate.

16. A method of manufacturing an electro-optical element according to claim 14 or 15, characterized in that the first and the second polarization inversion domains are formed by respectively providing electrodes on both mutually opposing main surfaces of the ferroelectric substrate and applying a voltage between these electrodes.

17. A method of manufacturing an electro-optical element according to claim 14 or 15, characterized in that the first and the second polarization inversion domains are formed in the first and the third step by irradiating charged particles having negative or positive electric charge therewith onto the surface on the negative or positive side of the spontaneous polarization of the ferroelectric substrate.

18. A method of manufacturing an electro-optical element according to claim 14 or 15, characterized in that, in the second step, the ferroelectric substrate is maintained at a prescribed temperature lower than the Curie temperature thereof.

19. A method of manufacturing an electro-optical element according to claim 14 or 15, characterized in that the ferroelectric substrate is constituted by a crystal that is represented by $LiNb_x Ta_{1-x} O_3$ (where $0 \leq x \leq 1$); and this substrate is maintained at a prescribed temperature not higher than the Curie temperature thereof in an atmospheric air or in an atmosphere of oxygen.

20. A method of manufacturing an electro-optical element according to claim 14 or 15, characterized in that the ferroelectric substrate is constituted by a crystal that is represented by $LiNbO_3$ and this ferroelectric substrate is maintained at a temperature of from 300° C. to 1150° C. within 30 hours as counted from the instantaneous moment in an atmospheric air or in an atmosphere of oxygen.

21. A method of manufacturing an electro-optical element according to claim 14 or 15, characterized in that the first and the second polarization inversion domains are irregularly formed at least in the propagation direction of the light beam.

22. A method of manufacturing an electro-optical element according to claim 14 or 15, characterized in that a plurality of the polarization inversion domains are irregularly formed in a direction perpendicular to the propagation direction of the light beam.

23. A method of manufacturing an electro-optical element according to claim 14 or 15, characterized in that the depths of a plurality of the polarization inversion domains are irregularly formed.

24. A method of-manufacturing an electro-optical element according to claim 14 or 15, characterized in that it has been arranged that the light beam passes through at least two domain walls of the polarization inversion domains.

25. A method of manufacturing an electro-optical element according to claim 14 or 15, characterized in that at least one of domain walls of the polarization inversion domains is formed perpendicularly, or substantially perpendicularly, to the electrode formation surface.

* * * * *